O. O. FELTS.
FEED APPARATUS FOR JOINTING SAWS.
APPLICATION FILED JUNE 27, 1908. RENEWED JULY 3, 1909.
993,045.
Patented May 23, 1911.
2 SHEETS—SHEET 1.
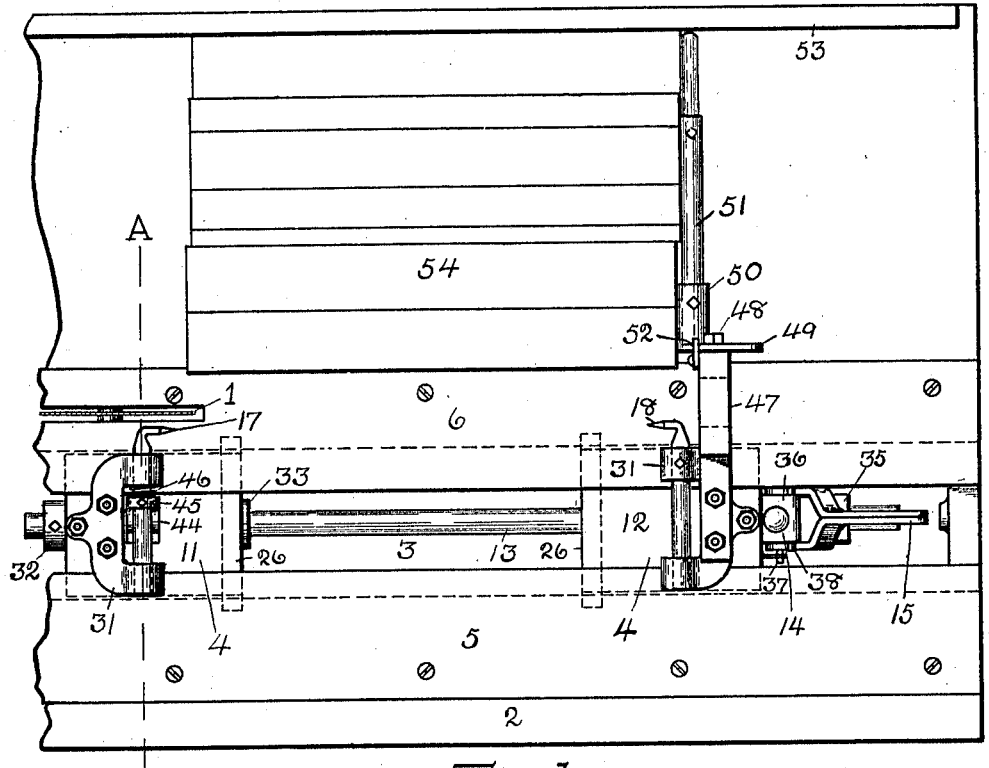
Fig-1-
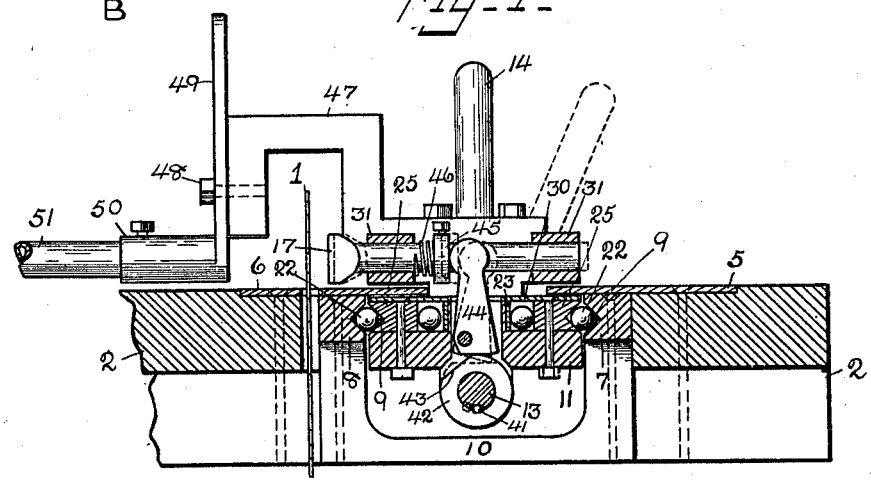
Fig-2-
WITNESSES:
John E. Heller,
Minnie C. Rollwage.
INVENTOR
Orange Orlando Felts,
BY Abraham Knobel,
ATTORNEY O. O. FELTS.
FEED APPARATUS FOR JOINTING SAWS.
APPLICATION FILED JUNE 27, 1908. RENEWED JULY 3, 1909.

993,045.

Patented May 23, 1911.

2 SHEETS—SHEET 2.

WITNESSES:
John E. Heller
Minnie A. Rollwage

INVENTOR
Orange Orlando Felts,
BY
Abraham Knobel,
ATTORNEY

UNITED STATES PATENT OFFICE.

ORANGE ORLANDO FELTS, OF NEW ALBANY, INDIANA, ASSIGNOR TO JOHN T. TOWSLEY, OF CINCINNATI, OHIO.

FEED APPARATUS FOR JOINTING SAWS.

993,045. Specification of Letters Patent. Patented May 23, 1911.

Application filed June 27, 1908, Serial No. 440,713. Renewed July 3, 1909. Serial No. 505,888.

*To all whom it may concern:*

Be it known that I, ORANGE ORLANDO FELTS, a citizen of the United States, residing at New Albany, in the county of Floyd and State of Indiana, have invented a new and useful Feed Apparatus for Jointing Saws, of which the following is a specification.

This invention relates to saws for jointing boards for glue-joints, etc., and the objects of my improvement are, the provision of a simple, effective, and easily operated device for holding a board and moving it over the table of a jointing-saw; to permit quick and accurate adjustment of the board in place upon the table; to insure against displacement of the board; to make it unnecessary to move the board more than once over the table in contact with the saw, in order to attain a straight edge; to permit considerable variation in the length of boards of a batch without necessitating readjustment of the means for holding or gripping the boards; to permit considerable variation in the thickness of boards; to provide a feed device which is readily adjustable with respect to boards of different lengths; to provide a feed device which is light and therefore may be moved back and forth without overcoming great inertia; to provide means by which a complete core or assemblage of jointed boards may be advanced; easy running; rapidity of operation; and durability.

These objects I attain by means of the mechanism illustrated in the accompanying drawings, in which—

Figure 3:
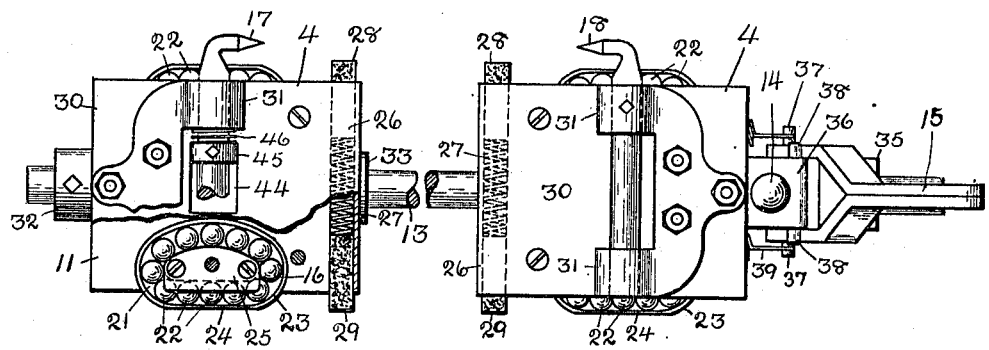
Figure 4:
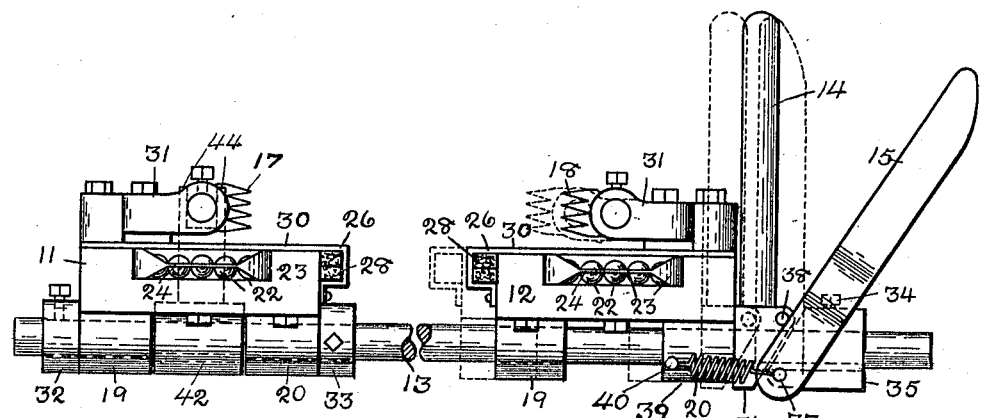
Figure 5:
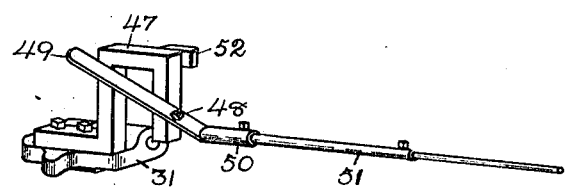

Figure 1 is a plan view; Fig. 2, a vertical transverse section on the line A—B of Fig. 1; Fig. 3, a detail plan view of the apparatus for holding the board; Fig. 4, a detailed side elevation of the same; and, Fig. 5, a detail perspective view of the attachment for advancing a completed core.

Similar reference numerals refer to similar parts throughout the several views of the drawings.

In the embodiment of my invention, an ordinary circular saw, 1, suitably constructed for the purpose of jointing boards, is mounted in a saw table, 2, of usual construction. The saw table 2 is provided with a longitudinal slot, 3, extending preferably its entire length. In this slot is mounted board-clamping apparatus, 4, on antifriction bearings, so as to be light running. Each border of the slot 3 is provided with a broad metal plate, 5 and 6, which partly cover the antifriction bearings, and protect them from saw-dust, splinters, and other obstructions, which would otherwise interfere with their easy operation. Immediately underneath the border strips 5 and 6, are arranged long metal bars, 7 and 8, provided with ball races, 9. These bars may be of rectangular cross-section, with a V groove in their adjacent or facing sides. The long bars 7 and 8 are rigidly secured to plates 5 and 6 respectively by riveting, or other means, and also to base-blocks, 10, preferably made of cast iron and accurately faced, so that the bars 7 and 8 shall remain straight and in accurate operative alinement.

In the grooves and the races just described, are mounted the board-clamping means 4, comprising two blocks, 11 and 12, connected by a shaft 13, provided with clamping-handles, 14 and 15, antifriction bearings, 16, and clamping-dogs, 17 and 18. The blocks 11 and 12 are provided with lugs, 19 and 20, longitudinally bored to receive the shaft 13. The shaft 13 is allowed to have a rocking motion in lugs 19 and 20.

In the upper rectangular portion of blocks 11 and 12, are provided, at the sides, elliptical recesses, 21, to accommodate balls, 22, of the antifricion bearings. These recesses I preferably line with elliptical bands, 23, which have their exposed portions narrowed down to the form of a wire, 24, to act as ball retainers, where the balls bear in the races 9. In the middle of the recesses 21, within the path of the balls 22, is placed a bearing block, 25, suitably grooved on the outer edge, to correspond with the groove in the stationary ball races 9.

In proximity to the balls 22, in blocks 11 and 12, I have placed a tubular structure, 26, in which is provided a spring 27, and a piece of felt, or other suitable material, 28 and 29, bearing against each end of spring 27. The pieces of felt 28 and 29 are thus adapted to be pressed outward with yielding pressure into the ball races 9 and keep them clear of dust.

The ball races 9 are surmounted and covered by a sheet metal plate 30. Above sheet metal plate 30, is rigidly secured, preferably by bolts, so as to be removable, a bearing-block, 31, in which are provided transverse bearings for the stems of clamping-dogs 17 and 18. The clamping dogs are slidably mounted, to permit them to advance toward or recede from saw 1.

The block 11 is prevented from longitudinal movement on shaft 13 by collars, 32 and 33, secured against each end of the block. The block 12 is adapted to be moved along shaft 13 and secured at any place thereon, for the purpose of adjusting the distance between dogs 17 and 18, to adapt the clamping means for receiving batches of boards, of different approximate lengths. The adjusting of block 12 is accomplished by means of a set screw, 34, in a block, 35, at the rear of block 12.

Provision is made on block 12 for clamping boards between dogs 17 and 18. This consists of the stationary handle 14, rigidly secured in a block, 36, which in turn is mounted slidably on shaft 13 at the rear of block 12, and the movable handle 15, pivotally mounted on block 35, which is adjustable along shaft 13. Handle 15 is pivoted on pins, 37, at the bottom of block 35, below shaft 13. Block 36, in which stationary handle 14 is secured, has its upper portion extended backward and is provided with bearing-lugs, 38, disposed above shaft, 13. It will now be understood that when handle, 15, is pushed forward at its upper end, since block 35 is set on shaft 13, the portion of handle 15 bearing against lugs 38 will push the lugs and their block 36 and slide the block forward on the shaft to the position shown by the dotted lines in Fig. 4. Block 12, is moved forward by block 36, thus causing dogs 17 and 18 to bite into the ends of the board and hold it securely.

It should be said, in regard to dogs 17 and 18, that their teeth are placed near saw 1, in order that a very narrow strip may be clamped, and, the teeth being arranged in a vertical line, they bite universally, no matter at what angle the ends of the board may have been cut.

When a board is to be released, handle 15 is released and is automatically swung back to the position shown in full lines, through the instrumentality of springs, 39. One end of these springs is attached to the pivot-pin 37, on stationary block 35, while the other end of the springs is attached to the rear lug of block 12 at 40. These being tension springs, they draw block 12 backward toward block 35, thus causing lugs 38 to swing the upper end of handle 15 backward. The clamping handles 14 and 15 are at the same time adapted to push the clamping means with the board along the slot 3, so that the saw takes off a portion of the edge of the board. The handles 14 and 15 have still another function, besides those of clamping and feeding, that is, to retract the jointed edge of the board from contact with the saw on the back stroke. To enable them to do this, blocks 35 and 36, upon which the handles are mounted, are provided, in the bottom of their bearings on shaft 13, with a feather, 41, which works in a keyway or spline in the lower side of the shaft; and block 36 is not rigidly fastened to block 12, but merely abuts against it with sliding contact. Thus, it will be understood, that handles 14 and 15 may oscillate in a vertical plane transverse to the axis of shaft 13 and may cause the shaft to rock in bearing-lugs 19 and 20 of blocks 11 and 12. Now between lugs 19 and 20 of block 11, a cam collar, 42, is mounted on shaft 13. The cam collar is provided with a feather which works in the spline of the shaft and therefore must rock with the shaft. Its upper surface is provided with a flat, 43. A bell-crank lever, 44, is pivoted in block 11, just above collar 42, and extends upward through cover-plate 30, and has its upper end bifurcated, so as to straddle the stem of dog 17. The stem of dog 17 is provided with an adjustable collar, 45, adapted to bear against the upper end of bell-crank-lever 44. A compression spring, 46, is mounted on the stem of dog 17, between collar 45 and the adjacent bearing lug. It will now be understood, that when handles 14 and 15 are oscillated outward, from the saw, as shown in Fig. 2 by the dotted lines, the flat 43, on collar 42, comes to the top. Spring 46 now presses collar 45 against the upper end of bell-crank lever 44, thus pushing the lower arm of the lever downward into contact with the flat 43, as shown by the dotted lines. In this way dog 17 is retracted from saw 1. When the handles are moved to the vertical position, the parts are in the position, shown in full lines, and dog 17 is advanced toward the saw. It is in this position that the board is fed to the saw. Before the back stroke the operator swings the handles outward, retracting the far end of the board from the saw and bringing the board back to the starting position, out of contact with the saw. This is done that the jointed edge may not be spoiled with scratches made by the saw on the back stroke, and also to avoid friction against the saw.

This feed apparatus, as thus constructed, runs very freely on its antifriction bearings, and is comparatively light, so that the operator, being relieved of friction, and on account of its lightness relieved of the necessity of overcoming inertia, is enabled to handle boards very rapidly and is capable of a large output.

I have also provided means for feeding or advancing an assemblage, 54, of the jointed boards, when completed, and thus clearing the table for the following assemblage. This consists of a bracket, 47, secured to block 12 and provided with an arch, adapting it to pass over saw 1. To the rear surface of bracket 47, at 48, is pivoted a lever, 49, having its upper end adapted as a handle and its lower end provided with a socket, 50, into which is secured a rod, 51, provided with means for adjustment as to length. A stop-lug, 52, is placed on the bracket in order that lever 49 may be stopped in the vertical or operative position. When the first board of a core or other assemblage of boards has been jointed, it is placed against a wall, 53, at the rear side of the table. The lever 49 is drawn back to the position shown in Fig. 5, so that rod 51 is elevated sufficiently to pass over the jointed boards. One board after another is placed on the table until a core is completed. The operator now pushes the upper end of lever 49 forward against the stop-lug 52. Rod 51 is now in position to engage the ends of all the boards and advance them along the table while the first board of the next core is being jointed. Lever 49 is then drawn back, and the operation is repeated.

Having thus described my invention, so that those skilled in the art pertaining thereto may be able to practice it, I claim—

1. A jointing-saw feed, comprising a board clamping device, means for moving a portion of said clamping device to withdraw the jointed edge of the board from the saw on the backward stroke and means carried by said clamping device for advancing or feeding forward an assemblage of jointed boards.

2. A jointing-saw feed, comprising, adjustable clamping means, for clamping universally a board lying flat upon the saw table, near the path of the saw; a clamping-handle on said clamping means; said clamping-handle mounted on a shaft, and adapted to swing in a vertical plane transverse to the path of said clamping means, and thus to withdraw the jointed edge of the board from contact with the saw, on the back stroke; and means secured on said clamping means for advancing a completed assemblage of jointed boards.

3. A jointing-saw feed, comprising a board clamping device, movable longitudinally past said saw, means for actuating said device to withdraw the jointed edge of the board from contact with the saw on the back stroke, and a lever for actuating said device to clamp a board in place, and for actuating said means.

4. A jointing saw feed comprising a device for clamping the board which is to be fed to the saw, a table having longitudinal ways in which the clamping device may be reciprocated, said table being adapted to receive an assemblage of jointed boards, an arm mounted upon the clamping device and projecting above the assemblage and means for setting the arm to engage and advance the assemblage of jointed boards.

5. In a jointing-saw feed, the combination of a table and saw mounted on said table, a clamping device movable along said table, past said saw, and comprising blocks engaging ways provided in said table, a shaft between said blocks for securing them together, clamping dogs carried by said blocks, and means actuated by said shaft for moving one of said clamping dogs, so that the jointed edge of the board clamped in place is withdrawn from the saw during the backward stroke.

6. A jointing-saw feed, comprising adjustable clamping means for securing a board in place in the path of the saw, a shaft coöperating with said clamping means, and a clamping handle on said shaft adapted to swing in a plane transverse to the path of the clamping means and to thereby withdraw the jointed edge of the board from contact with the saw.

ORANGE ORLANDO FELTS.

Witnesses:
W. B. MUNNELL,
M. C. ROLLWAGE.

---

Copies of this patent may be obtained for five cents each, by addressing the "Commissioner of Patents. Washington, D. C."